United States Patent [19]

Gruesbeck

[11] 4,282,467
[45] Aug. 4, 1981

[54] CONTROLLER SYSTEM FOR ROTARY ACTUATOR

[75] Inventor: William G. Gruesbeck, Gettysburg, Ohio

[73] Assignee: Ex-Cell-O Corporation, Troy, Mich.

[21] Appl. No.: 79,666

[22] Filed: Sep. 28, 1979

[51] Int. Cl.³ .............................................. G05B 13/00
[52] U.S. Cl. ..................................... 318/561; 318/674; 318/627
[58] Field of Search ................. 318/674, 627, 484, 561

[56] References Cited

U.S. PATENT DOCUMENTS

| | | | |
|---|---|---|---|
| 2,776,396 | 1/1957 | Gille et al. ........................... | 318/627 |
| 3,456,173 | 7/1969 | Funfstuck ........................ | 318/674 X |
| 3,546,558 | 12/1970 | Lawler ............................... | 318/672 X |
| 4,037,519 | 7/1977 | Miller et al. ...................... | 318/672 X |
| 4,077,000 | 2/1978 | Grubbs .......................... | 318/672 X |

Primary Examiner—B. Dobeck
Attorney, Agent, or Firm—Frank D. Risko; John C. Evans

[57] ABSTRACT

This invention relates to the hydraulic control field wherein an electronic controller provides the necessary electrical elements for controlling the movement of an actuator shaft from one pre-selected position to another pre-selected position at a pre-selected velocity and provided with an automatic timing control circuit to sustain the movement or a manual operation to selectively move the actuator. The pre-selected positions and velocities are adjustable over the full range of actuator movement and velocity limit of the hydraulics.

9 Claims, 6 Drawing Figures

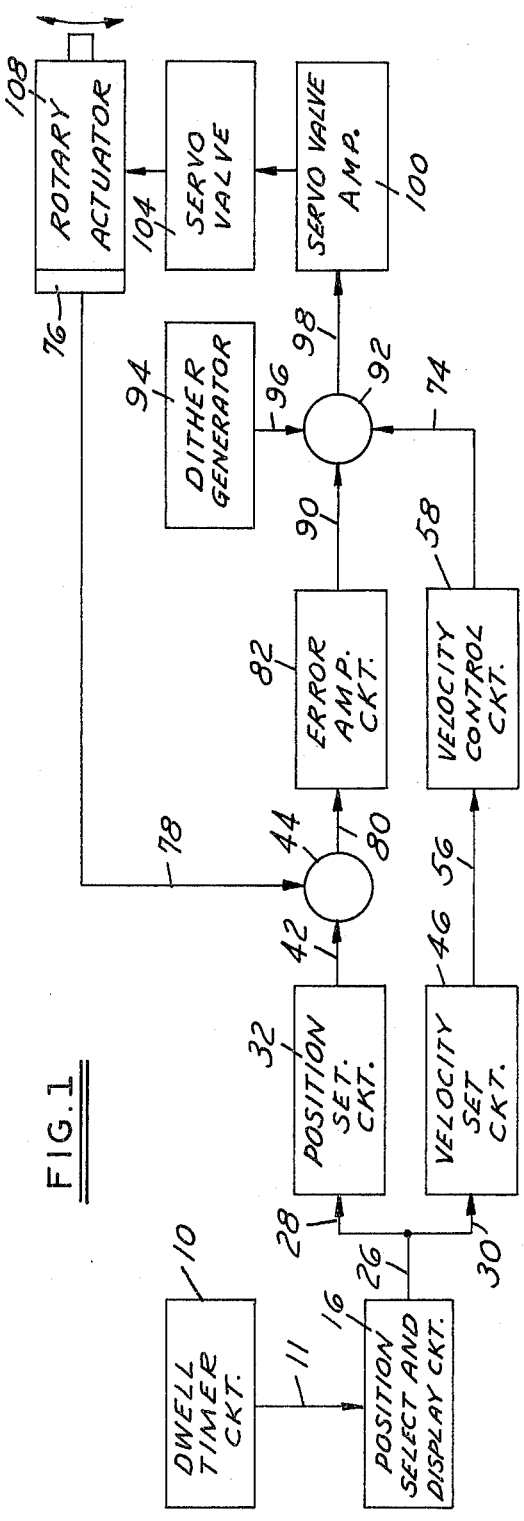
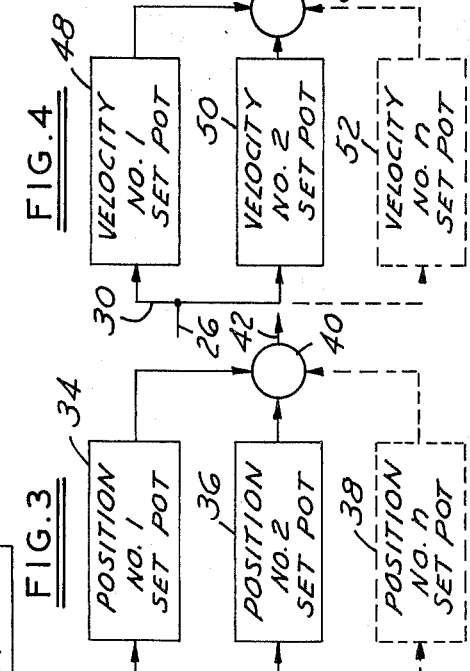
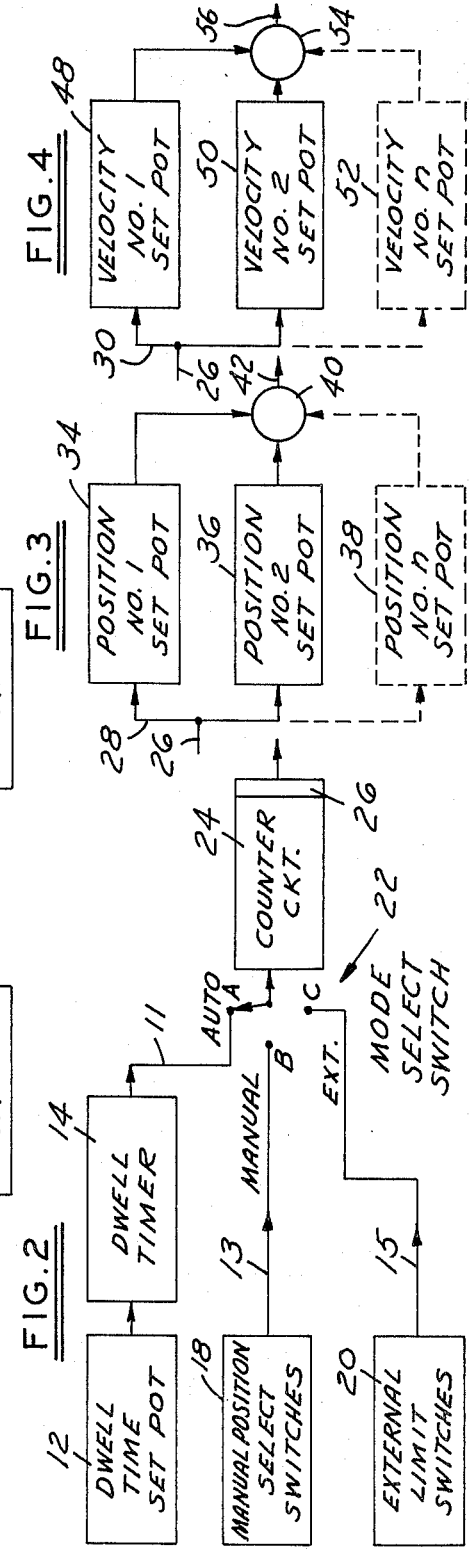

CONTROLLER SYSTEM FOR ROTARY ACTUATOR

TECHNICAL FIELD

This invention relates to the control of position, velocity and deceleration of rotary actuators, and more particularly, to an electronic controller for positioning such devices at any two or more stopping points in the arc of rotation. The position and maximum angular velocity attained during movement are externally and independently adjustable.

BACKGROUND ART

A rotary actuator, or for that matter, a linear actuator, as well, can be controlled by a servo valve and a servo valve amplifier to move to a particular position in a given system. The ultimate static position of the shaft is maintained in a specific location provided the load that is on the shaft of the actuator is within the design of the system. This would apply to both a rotary and a linear type actuator. An external feedback system, such as a potentiometer, would feed back position information to an amplifier which would compare the output of a position reference to the position information coming from the feedback potentiometer. When the two voltages or currents are equal, the system would null out and the position of the actuator would be established. This system would hold that particular static position regardless of the nature of the load unless the load exceeded the hydraulic forces in the actuator. Another type of system would involve a manual movement of a control by an operator to control the amplifier which is feeding the servo valve. A typical type device, sometimes known as a joy stick, is used to move the actuator from one position to another position. Once the system has stopped, the actuator would maintain its particular position because of an external feedback system that would feed back the position information into a controller or amplifier and maintain that particular position regardless of the load provided that the load is in the load design range of the given actuator. Both of these systems described above are old in the art and have been used for many many years in controlling rotary and linear actuators.

My invention improves upon the state-of-art and allows an actuator shaft to be accurately controlled so that the specific position of the shaft can be established at any two pre-selected points in a given system and be able to return to those points accurately. This would be functional for both rotational and linear type actuators. Also, the velocity of the speed of rotation to each position is also adjustable by my invention. The system can be expanded so that more than two positions or velocities can be obtained. That is, the actuator could stop at any number of positions depending upon the number of reference potentiometers that are designed into the system. This is also true for the velocity. The deceleration can be fixed or made adjustable depending on the design and requirements of a system.

DISCLOSURE OF INVENTION

It is, therefore, one of the objects of the present invention to provide a controller system for pre-selecting two shaft positions and two velocities in the controller so the movement of the shaft of an actuator from one position to another position and the returning of that shaft to the first position is accomplished accurately. It is the object of this invention to control an output shaft on a rotary actuator. Another object of the invention is to provide a timing circuit in the system so that the positions can be automatically changed from one point to a second point. Another object of the invention is to provide manual selection and operation of the position controls to initially place the actuator shaft at any one of an infinite number of positions for each of the two particular positions of the actuator. In addition, external limit switches can also be incorporated into the system to affect external selection of one of the two pre-set stopping points if a dynamic system is being operated.

According to the present invention, a rotary actuator system is arranged to provide a means for selecting a first shaft position of an actuator and having that actuator move at a pre-selected velocity to a second shaft position and stop at that particular position and then have the actuator reverse and move to the original first set position at a specific maximum velocity with the movements between the first and second positions being controlled automatically through a timing circuit.

BRIEF DESCRIPTION OF DRAWINGS

FIG. 1 is a general block diagram showing the basic elements of the controller system and the relationship to the mechanical elements.

FIG. 2 is a block diagram of the dwell timer circuit and position select and display circuit.

FIG. 3 is a block diagram representation of the position set potentiometers and summer.

FIG. 4 is a block diagram of the velocity set potentiometers and summer.

DESCRIPTION OF THE PREFERRED EMBODIMENTS

Figure 5:
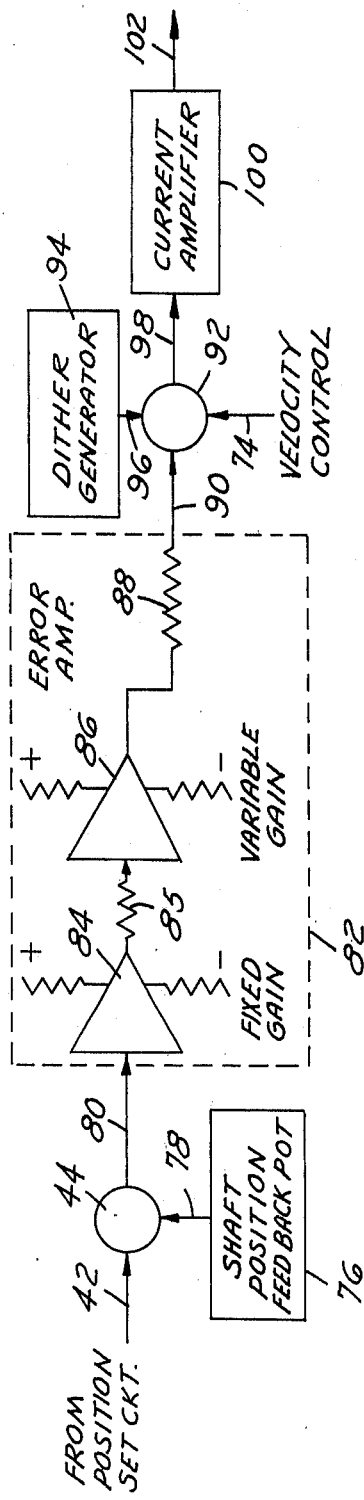
FIG. 5 is a block and schematic diagram of the summing junctions and the error amplifier.

The overall schematic block diagram is shown in FIG. 1. Specific position information and velocity information are set in the respective circuits. The timer circuit will alternately select a position and velocity circuit at a preset interval. The new set position information is fed into a summing junction which determines the error signal which is fed into an error amplifier and is then summed with the velocity information which limits the output of the error amplifier to a pre-determined value along with a dither signal which is then fed into the servo amplifier. The servo valve, driven by the servo amplifier, controls the rotary actuator. As the shaft is moving to its new position, the feedback error is being reduced and when the error reachs zero the actuator will stop. The velocity of movement of the actuator shaft is controlled by the velocity control circuits. After the cycle has timed out, a new position and velocity is selected and the process is repeated. The ability to selectively establish the various positions and the ability to selectively set the velocity of movement between the positions is a new and innovative feature not previously found in the prior art of actuator control systems.

The dwell timer circuit 10 is connected to a position select and display circuit 16 by lead 11. FIG. 2 shows a dwell time set pot 12 electrically connected to dwell timer 14 with an output 11 connected to mode select switch 22, position A. Manual select position switches 18 are connected through lead 13 to position B on the mode select switch 22. The manual position select switches 18 consist of pushbutton switches which can select either position 1 or position 2 for the controller during a manual mode of operation. External limit switches 20 are connected through lead 15 to position C on mode select switch 22. The purpose of the external limit switches is to allow for external control of the rotary actuator via limit switches. The mode select switch 22 connects to a counter circuit which consists of a number of integrated circuit chips which allow the unit to select either position 1 or position 2 and velocity 1 or velocity 2 of the position and velocity set circuits. The output of counter circuit 24 is connected to bus 26. In FIG. 1 bus 26 connects to lead 28 going to the position set circuits 32 and bus 26 also goes to lead 30 and connects to the velocity set circuits 46.

FIG. 3 shows the position set pots, position No. 1 set pot 34, and position No. 2 set pot 36. As is shown in this figure, additional set pots could be added to the system thereby giving an infinite number of additional positions that could be controlled by the position set pots. Obviously this would be limited to a finite practical number. Position No. n, set pot is element 38. The outputs of the position set pots are fed into a position set pot summing junction 40 also shown in FIG. 3. The output 42 of this summing junction 40 is fed to the feedback summing junction 44 best seen in FIG. 1. FIG. 4 shows the velocity set pots 46 in a little more detail. Velocity set pot no. 1 element 48, and velocity set pot no. 2 element 50 are shown fed into the velocity summing junction 54. In addition to the two velocity pots which can be set by the controller system, velocity No. n set pot, element 52 is shown in dotted lines with its output feeding the summing junction 54. Here again, the values of the different pots can be preselected so that an infinite number of velocities could be selected within the range of the system. In the embodiment shown only two velocity set pots are shown and only two position set pots are shown. If addition position and velocity set pots are added, addition control, counting and bus circuit are needed which selects these circuits.

The output of the velocity set circuit 46 in FIG. 1 is fed via lead 56 to the velocity control circuit. This circuit is shown in detail in FIG. 6 and consists of an inverter 60 having an output 61 which feeds to inverter 64 via input line 62 and also to diode 72 via lead 66. Inverter 64 is fed to diode 70 via lead 68. The diodes 70 and 72 are bussed together and are then fed to line 74 which is the input to the servo amp summing junction 92. The output of the position set pots are fed to summing junction 40, lead 42 feeds the feedback summing junction 44 and then is fed into error amp circuit 82 via lead 80 which is the output of summing junction 44. The error amp circuit 82 is shown in FIG. 5 and consists basically of a two stage amplifier. The first stage is a fixed gain stage 84 which is fed into a variable gain stage 86. The output of stage 86 is then fed through resistor 88 and then to the servo amp summing junction 92 via lead 90. A dither generator 94 is also fed into summing junction 92 via lead 96. The output of this summing junction 92 is then fed via lead 98 to the servo valve current amplifier 100.

Amplifier 100 is fed to servo valve 104 and then to rotary actuator 108 as shown in FIG. 1. The shaft position feedback pot 76 shown in FIG. 5 is attached to the rotary actuator 108 and feedback line 78 feeds into summing junction 44. The servo valve amplifier 100 is a typical current amplifier well known in the art and a detailed description of it here is not necessary. The servo valve 104 is either mounted to a manifold and then piped to the actuator or mounted directly to the rotary actuator 108. This direct manifolding technique in rotary type actuators is well known in the industry, therefore, detailed descriptions of these elements will not be given here.

DESCRIPTION OF OPERATION

This controller is designed to alternately scan two stations and provide appropriate outputs to drive the servo valve shown in FIG. 1. The position set pots are set to the particular rotary position which is desired of the rotary actuator. The velocity set pots are then also adjusted to provide the proper velocity to travel from position 1 to position 2 and from position 2 back to position 1. The programmed position set pots 34 and 36 in FIG. 3 would be preset as would the velocity set pots 48 and 50 in FIG. 4. Since the velocity of the rotary actuator 108 could not jump instantaneously to a particular value, the values that the velocity set pots do establish are the maximum velocities which occur during the movements of the rotary actuator.

In the automatic mode of operation via the mode select switch 22 as shown in FIG. 2, the dwell timer set pot 12 would be adjusted to provide the correct timing cycle for positioning the rotary actuator 108 between position 1 and position 2. The dwell timer 14 would provide an automatic timed signal via lead 11 to the counter circuit 24 which would then automatically scan between position 1 and position 2 for operation of rotary actuator 108. The position set pot no. 1 will establish a reference signal on line 42 going into the feedback summing junction 44 which would be compared with the signal coming from the shaft position feedback pot 76 via line 78 to provide an error signal. This error signal would then be fed into error amp circuit 82 via lead 80. That error signal would then cause a signal to be sent to the servo valve summing junction 92. Since a signal is present then on lead 98 feeding the servo valve, the valve would then move the second stage of the spool assembly and port hydraulic fluid into the rotary actuator. As the actuator shaft approaches the preset selected position, the shaft position feedback pot 76 signal to junction 44 is decreasing which causes the error signal seen on line 80 going into the error amplifier circuit to decrease until it is essentially zero. At this time, the error circuit output on line 90 would also be reducing and hence the signal to the servo valve amplifier would essentially reduce also to zero causing the rotary actuator 108 to stop. The velocity control circuit 58 also feeds the servo amp summing junction 92 via lead 74. This information combined with position information would determine the speed with which the servo valve amp would port fluid to the servo valve and hence, the maximum velocity of the rotary actuator the velocity signal determines the maximum velocity which will be attained. When the actuator slows down below the maximum, the position signal will determine velocity. A dither amplifier 94 is shown connecting into summing junction 92. The purpose of the dither amplifier, which will not be shown in detail, is simply to provide a 60 hertz low amplitude signal level into the servo valve via the servo valve amplifier so that it would eliminate stiction in the system.

In the automatic mode, after the system has reached its preset position and the timer has timed out, it would then switch the counter circuit to the next position or position no. 2 and then position pot 36 in FIG. 3 would be providing the input signal to the summing amplifier 44. This signal coming now on line 42 would then be compared with the shaft position feedback pot 76 signal coming to the summing junction 44 on input line 78. The error signal would then again be generated on input line 80 to the error amplifier. The same series of electronics would take over and move the servo valve in the opposite direction to then port hydraulic fluid to the rotary actuator to minimize the error signal. This then would move the shaft to its second position. Since the counter circuit had selected the position no. 2 set pot, it will also simultaneously select velocity no. 2 set pot and since the velocity on this set pot 50 can be preset to a different velocity than on set pot 48, the rotary actuator 108 would travel to position no. 2 at the velocity established by velocity set pot 50. After the dwell timer 14 has timed out, it would then send a signal to the counter circuit to reset the circuits to position 1 and the cycle would be restarted. The application for this type of equipment would be in a repetitive process wherein a motion of a fixed arc of rotation is desired to be established. That is, an arc of rotation of say from 5° to 100° could be set up. If it is desired to change the angular motion of the shaft, it can be easily done by changing the position set pot 34, for example, to a different position or position set pot 36 to another position. Therefore, the angular motion of the shaft could be from 25° to possibly 75°.

Such a system can readily be used in automated conveyor lines where it is necessary to move parts from one system to another system all in a predetermined time frame. It would also allow materials to be moved from one position to another position at a very slow velocity and once deposited in the second position and released there, the depositing mechanism would return to the original position at a much higher speed since the requirement for the slow velocity is no longer needed. The deceleration rate of the system is controlled by resistor 85 in FIG. 5 in the variable gain stage 86 of the error amplifier 82. By varying the value of the resistor in this stage, the deceleration rate can be increased or decreased. As this resistor 85 is increased in value, the gain of the variable gain stage 86 is reduced and as it is decreased, the gain is increased.

The position select and display circuit 16 is built from solid state integrated circuit chips. The circuit is designed to energize one of two light emitting diodes or lamps located in the circuit so that it is possible to know whether the rotary actuator shaft position is in position 1 or position 2. Obviously, if additional set pots are used it would be a simple matter to add additional light emitting diodes to indicate the particular position which the rotary actuator has moved to. With the mode select switch 22, as shown in FIG. 2 in the manual or B position on the switch, it is possible to now manually position the rotary actuator 108 to either position 1 or position 2. The manual position select switches 18 will perform this function. They are simple momentary contact pushbutton switches which will reset the electronics to either position 1 or position 2. This mode of operation is extremely helpful since it is possible to control the exact position that is desired of the rotary actuator by the position pot. That is, with the position pot preset to a particular position, the set pot can be rotated to a new position and the rotary actuator 108 will rotate to follow the position set pot since the feedback signal is continuous. It will follow the position set pot because the error amp feedback summing junction will sense a change in the signal coming from the set pot and cause the system to react. Also this position is very helpful in setting the velocity set pots so that the correct speed can be achieved. Here again, in order to switch from position 1 to position 2 it is only necessary to manually select the switch for that particular position. Also shown in FIG. 2 are external limit switches 20 which can be mounted in conjunction with the rotary actuator or some other machine element. Upon a particular rotation or machine element movement, a limit can be set so it is possible for the system to then provide a signal to the counter via the mode select switch 22 position C which will reset the electronics to either position 1 or position 2 and with the limit switches replacing the timing inputs depending upon which limit switch has been selected. Once the system has been started in the external limit switch mode, it will be necessary to manually de-energize the system in order for it to be shut down. That is, it will automatically continue to move from position 1 to position 2 and return using only the external limit switch inputs.

Figure 6:
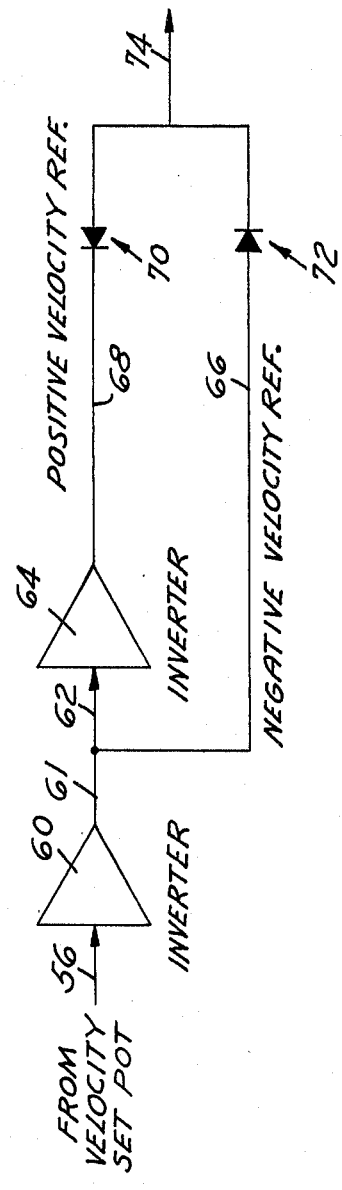
FIG. 6 is a schematic of the velocity control circuit.

In FIG. 3, bus 26 connects into input lines 28 which feed the signal from the counter circuit 24 to position no. 1 set pot 34 or to position no. 2 set pot 36. An identical bus feeds from line 26 to the input line 30 feeding the velocity no. 1 set pot 48 and velocity no. 2 set pot 50. These are shown in FIG. 4. The counter circuit 24 and bus lines 26 are electrically connected so that only one of either the two position programming pots 34, 36 or one of the velocity set pots 48, 50 are actually energized. The other one is de-energized. Since only the one position pot is energized at a time, this circuit will respond only to the setting of that one position or velocity pot at a given time. The velocity control circuit shown in FIG. 6 is set up to accomplish its objectives by limiting the voltage applied to the servo valve. The velocity control pots are energized by the counter circuit 24 as noted above. The output of the velocity control pots are fed to a summing junction 54 so that regardless of which velocity control pot is selected the output will then be placed on the input to the velocity control circuit 58. This circuit is shown as a two inverter clipping circuit in FIG. 6 and is used to generate the positive and negative voltage limits via the diodes 70 and 72 used as reference inputs to the summing junction 92. If the output of the error amplifier 82 rises above the reference level in either the positive or negative direction, one of the diodes 70, 72 in the clipping circuit will begin to conduct. This in turn causes a voltage drop across resistor 88, causing the input on line 90 to drop back to the reference level. The summing junction 92 which feeds servo valve amp 100 also has dither generator 94 feeding that junction. Servo valve amplifier 100 then feeds servo valve 104 via line 102. This dither generator will reduce the "stick-slip" friction and minimize the amount of error signal necessary and thereby increase the sensitivity of the system by keeping the valve spool in servo valve 100 in constant oscillatory motion. Details of this circuit are not shown because dither generators are well known in the art. This slight oscillatory motion will not effect or cause the rotary actuator 108 to see any movement. Its purpose is to reduce the signal necessary to move the spool to cause the rotary actuator to begin its motion to a new position.

In the design of this system, a fluid power source would feed servo valve 104 and the rotary actuator 101 but are not shown here since such hydraulic systems are well known in the art. In summary, this invention provides a controller system for a rotary actuator which allows the selection of specific actuator stop positions and specific velocities to move to those positions. The controller further causes the actuator system to be moved automatically by a timing circuit set up to input the position and velocity set circuits. In addition, additional position set pots and velocity set pots may be added to the system whereby additional positions and velocities could be pre-set. It should be further noted that although a rotary actuator was shown in the example and embodiment herein described, this system could be set up to operate on a linear actuator as well.

Although the illustrative embodiment of this invention has been described in detail for the purpose of disclosing the structure and nature of the invention, it is understood that particular changes could be made without departing from the spirit and scope of the invention and those changes would be covered by the following claims.

I hereby claim:

1. An actuator system comprising an actuator means having a position feedback means attached thereto, a servo valve means, a servo valve amplifier means, a first summing means having a position error input and a velocity control input, a position error amplifier feeding said first summing means, a second summing means feeding said position error amplifier means, and the improvement comprising an electrical controller means having means for selectively setting and continuously controlling a first position control signal, mixing said position control signal with a signal from said position feedback means in said second summing means and feeding this difference signal into said position error amplifier means, means for selectively setting and controlling a second position control signal, means for selectively setting and controlling a first velocity control signal and feeding said velocity control signal into said first summing means, means for selectively setting and controlling a second velocity control signal, mode selection and control means for simultaneously selecting said first position signal and said first velocity signal and automatically selecting said second position signal and said second velocity signal for moving from a first actuator position to a second actuator position and means to maintain said second actuator position.

2. The apparatus of claim 1 having means for setting and controlling the acceleration and deceleration for moving from said first preselected position to said second preselected position.

3. The apparatus of claims 1 or 2 having means for automatically moving from said first actuator position to said second actuator position and reciprocate between them at a predetermined time interval.

4. The apparatus of claims 1, 2 or 3 wherein said actuator is a rotary actuator having less than 360° rotation.

5. The apparatus of claim 1, 2 or 3 wherein said actuator is a linear actuator having a variable bi-direction shaft movement.

6. An actuator system comprising an actuator means having a position feedback means attached thereto, a servo valve means, a servo valve amplifier means, a first summing means having a position error input and a velocity control input, a position error amplifier feeding said first summing means, a second summing means feeding said position error amplifier means, and the improvement comprising an electrical controller means having means for selectively setting and continuously controlling a plurality of position control signals, mixing each position control signal with a signal from said position feedback means in said second summing means and feeding this difference signal into said position error amplifier means, means for selectively setting and controlling a plurality of velocity control signals and feeding each velocity control signal into said first summing means, mode selection and control means for simultaneously selecting a particular set of position control and velocity control signals for continuously maintaining said position and means for automatically selecting another set of position control and velocity control signals and means for continuously holding said actuator in said new position.

7. The apparatus of claim 6 having a means for setting and controlling the acceleration and deceleration for moving from one said preselected set position to another.

8. The apparatus of claims 6 or 7 having means for automatically moving from said one set of said positions to another.

9. The apparatus of claim 1 or 6 having means for selecting and controlling said actuator movement by external means.

* * * * *